Nov. 17, 1964    ISAO MATSUKASA ET AL    3,157,875
MOVING TARGET RADAR DELAY LINE FILTER
Filed Feb. 5, 1962    2 Sheets-Sheet 1

INVENTORS
I. MATSUKASA
Y. ISHIZAKI
BY
AGENT

Nov. 17, 1964  ISAO MATSUKASA ET AL  3,157,875

MOVING TARGET RADAR DELAY LINE FILTER

Filed Feb. 5, 1962  2 Sheets-Sheet 2

*INVENTORS*
I. MATSUKASA
Y. ISHIZAKI

BY *Arthur M. Freedman*

AGENT

United States Patent Office 3,157,875
Patented Nov. 17, 1964

3,157,875
MOVING TARGET RADAR DELAY LINE FILTER
Isao Matsukasa and Yasutoshi Ishizaki, both of Tokyo, Japan, assignors to Nippon Electric Company, Limited, Tokyo, Japan, a corporation of Japan
Filed Feb. 5, 1962, Ser. No. 170,912
Claims priority, application Japan Feb. 6, 1961
8 Claims. (Cl. 343—7.7)

This invention relates to an improved delay line filter, and in particular to one such as is used in Moving Target Indication (MTI) radar or in a radar signal integrator.

Since the salient technical merits of a delay line filter, according to the present invention, are available when the filter is applied to an MTI radar or a signal integrator for a radar, both will be described hereunder.

MTI radar has the function, as is well known, of cancelling a signal reflected from a fixed target, but displaying a signal reflected from a moving target. In order to cancel the fixed target signal the radar equipment comprises a filter (in the following discussion this filter will be referred to as a delay line filter since the circuitry constituting the filter includes at least one delay line) which effects such a result. This filter must have comb filter characteristics as will be later explained. Since, however, the manufacture of filters having ideal comb characteristics is impracticable, a delay line filter of simpler construction using one delay line (delay line and delay circuit are used interchangeably), as will later be described, is generally used as a substitute. The transmission characteristics of this delay line filter gives only a rough approximation to the ideal comb filter characteristics, causing inherent shortcomings such that the signal portion reflected from a fixed target is insufficiently cancelled and an extremely small response to the reflected signal from a target moving at a low speed tends to make the overall video image indistinct.

The so-called radar signal integrator, with which pulses reflected from a target are picked out of a reflection signal containing noise, is a device for superimposing pulses arranged at regular intervals (in the incoming pulse train). This differs from MTI radar where a signal reflected from a fixed target is cancelled by adding pulses entering into the receiver, at regular intervals, in opposite phase. Nevertheless here again a favorable approximation to the ideal transmission characteristics cannot be obtained with a delay line filter using only one delay line.

To eliminate the above defects, an effort has been made to improve the characteristics of delay line filters and approximate more closely the ideal comb filter characteristics. For instance, a delay line filter circuit in which two conventional delay lines are connected in cascade has been proposed. With this type delay line filter, however, it is extremely difficult to conform the two delay times with the result that the transmission characteristics considerably deteriorate.

Hence it is the object of the present invention to provide an improved delay line filter having more ideal comb transmission characteristics, yet avoid the utilization of two delay line filters in cascade.

The above-mentioned and other features and objects of this invention and the manner of attaining them will become more apparent by reference to the following description taken in conjunction with the accompanying drawings, wherein.

In order to lay a sufficient foundation for a clear understanding of the invention described herein, a conventional MTI radar circuit, and a conventional radar signal integrator will first be described.

Figure 1:
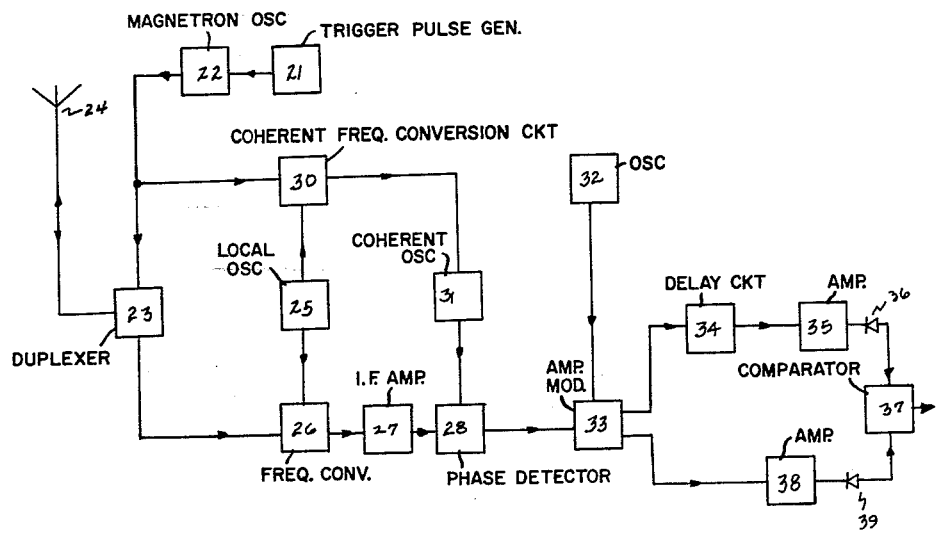
FIG. 1 shows a block diagram of the conventional MTI radar.

Turning now to FIG. 1, which illustrates a conventional MTI radar; magnetron oscillator 22 is triggered by the output pulses of a trigger pulse generator 21. The output of this oscillator 22 is applied to radar antenna 24 via duplexer 23. The reflected signal from the target, received by the antenna 24, is applied to frequency converter 26, where the signal is converted to an intermediate frequency by interaction with the signal from the local oscillator 25. This signal is then amplified by IF amplifier 27 and applied to a phase detector 28. Meanwhile, the output of the magnetron oscillator 22 is branched, at the input side of the duplexer 23, and applied to a coherent frequency conversion circuit 30. This circuit is supplied by the local oscillator 25 in the same manner as mentioned above; its output being utilized to control the phase of the output of a coherent oscillator 31. By applying the output of 31 to the phase detector 28, pulses indicating the reflected signals from both fixed and moving targets are produced at the output of the phase detector as is well known. In order now to obtain MTI, the latter component must be removed from the reflected signal. The conventional technique of using a delay line filter to cancel the unwanted signal is described in S. Matsuda, "Fixed Target Cancellation Filter Using Delay Lines," Aviation Electronics (Corona Publishing Co.); March 31, 1956, p. 545, as well as H. Urkowitz, "Analysis and Synthesis of Delay Line Periodic Filters," I.R.E. Transactions on Circuit Theory, pp. 41–53; 1957.

The delay lines delay the input signal for a certain pass band (as will be mentioned later) and therefore, in order to convert the signal frequency to a frequency suitable for the operation of the delay lines, the output of the oscillator 32 (whose frequency is equal to the center frequency of the operating characteristics of the delay lines) is modulated by the output pulses of the phase detector 28 at an amplitude modulator 33. The modulated output is divided into two portions, one of which is applied to comparator 37 by means of a delay circuit 34, an amplifier 35 (to compensate for the attenuation of the signal due to this delay circiut) and a diode 36; while the other is applied to comparator 37 by means of another amplifier 38 and a diode 39. The comparator, as is well known, comprises an adder and an amplifier, capable of adding the output signal of the diode 36 and that of the diode 39 in opposite phase. It may, as is well known, be constituted by a single differential amplifier.

The composition of the MTI radar equipment shown in FIG. 1 has been widely used, and appears for example in "Radar System Engineering," McGraw-Hill Book Co. Inc., New York, N.Y.; FIGS. 16.3, 16.9 and 16.11.

Figure 2:
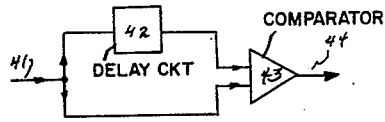
FIG. 2 illustrates an idealized block diagram of the equivalent circuit of the right hand side of FIG. 1.

From an operational viewpoint the portion between the output of the phase detector 28 and the comparator 37 in FIG. 1 can be idealized as shown in FIG. 2. In this diagram of a delay line filter, the input end 41 corresponds to the input end of the amplitude modulator 33

(of FIG. 1) while the series circuit consisting of the delay line 34, amplifier 35, and diode 36 corresponds to delay circuit 42. Further a comparator 43 and its output 44 correspond to the comparator 37 and its output in FIG. 1. It is assumed in the idealized circuit of FIG. 2 that the amplitude modulation actually used in the circuit of FIG. 1 is omitted and that the delay line 42 does not cause attenuation. In other words, since the delay circuit 34 has an attenuation of the order of from 50 to 80 db, a compensating amplifier 35 is inserted. On the other hand, amplifier 38 is likewise inserted into the circuit excluding the delay line so as to conform the amplitude characteristics of the two parallel circuits. In this way, it is possible to make the level of a signal passing through the series circuit of the delay circuit 34, amplifier 35, and the diode 36 exactly equal to the level of the signal passing through the series circuit of the amplifier 38, and the diode 39. In addition, the attenuation caused by the delay line 34 is compensated by the amplifier while the amplitude modulation necessary for the adaptation of the band-pass characteristics of the delay line 34 is detected by the diode 36; whereby the delay circuit constituted between the delay line 34 and the detector circuit 36 becomes equivalent to a delay circuit with low-pass characteristics which is devoid of attenuation. Since a passing signal is normally restricted to a finite band, the circuit may be deemed a delay circuit with overall passband characteristics. The delay line 42 in FIG. 2 is a delay line as mentioned above.

Figure 3:
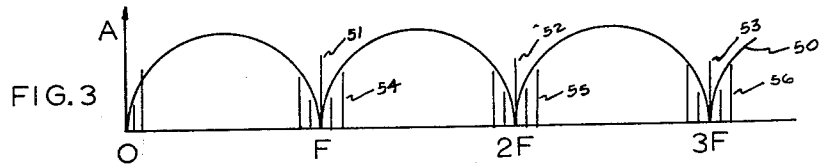
FIG. 3 shows the amplitude vs. frequency transmission characteristics of the circuit of FIG. 2.

Let the transmission characteristics of the delay line filter of FIG. 2 be illustrated by taking the frequency $f$ and passing amplitude A as the abscissa and ordinate, respectively. Then a characteristic curve 50 shown in FIG. 3 is obtained. This curve may also be found on FIG. 4, page 41, in the article by H. Urkowitz (supra).

Figure 4:
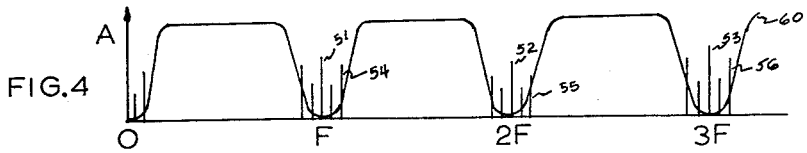
FIG. 4 illustrates more favorable transmission characteristics.

Referring to FIG. 3, a delay line filter will be designed so that F, taken at the abscissa, becomes a frequency equal to the repetition frequency of the transmitted pulses. As is detailed on page 554 of the above-mentioned article by S. Matsuda, the input reflected waves of the radar equipment have reflected signal components from the fixed target at points on the frequency axis spaced at the regular repetition frequency intervals F, on either side of the transmitting pulse frequency $f_0$ as the center frequency. After the reflected waves have been detected at phase detector 28, the reflected signal components are distributed at the points O, R, 2F, 3F . . . on the frequency axis. In FIG. 3, these reflected input signal components are denoted by amplitude components 51, 52, and 53. As has been mentioned above, by designing the transmission characteristics of a delay line filter so as to conform to the characteristic curve 50, reflected signals from these fixed targets can be cancelled. In proximity to the signals 51, 52 and 53, reflected from fixed targets, exist a widened spectra of signals reflected from actually fixed targets caused by the rotation of the antenna and targets having small velocity components 54, 55, and 56 (such as signals reflected from trees waving in the wind). It is desirable to cancel these signals also. It will be understood that although these components have been suppressed by the existence of the corresponding portion of the transmission characteristic curve 50, they still possess considerable output components. Further, as will be evident from FIG. 3, the cancellation circuit has a defect such that the intensity of the output signal, or the reflected signal from a target having a velocity larger than that to be cancelled (that is, the output signal from the actually moving target) is changed with the speed of the moving target. In order to remove this defect, it is necessary to provide a characteristic curve 60 for the delay line filter, as shown in FIG. 4. As may be seen this filter has attenuation bandwidths equal to the spectrum widths for reflected signals from fixed targets and waving trees and provides a frequency response, within the pass band, as flat as possible.

In order to obtain the characteristic curve 60, shown in FIG. 4, a method of using two delay lines, such as shown in FIG. 2, connected in cascade has been proposed in W. White and A. Rewin, "Recent Advances in the Synthesis of Comb Filters," I.R.E. National Convention Record, Part II, pp. 186–199; 1957. In this article, a description is made with regard to up to three cascaded delay lines. However, for simplicity of explanation, a block diagram for two stages in cascade is illustrated in FIG. 5.

Figure 5:
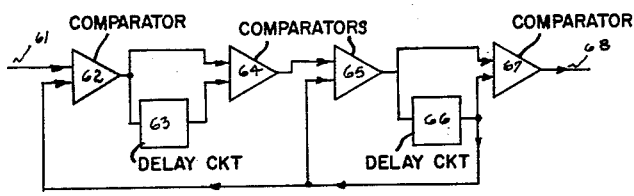
FIG. 5 illustrates an idealized block diagram of a circuit for obtaining the frequency response of FIG. 4.

Referring to FIG. 5, the input pulses from an input terminal 61 (which corresponds to the input terminal 41 of FIG. 2) are applied to a comparator 62, the output of which is then divided into two parts; one is directly applied to a succeeding comparator 64, while the other is indirectly applied to the same comparator through a delay circuit 63 (which is equivalent to the delay line 42 of FIG. 2). The output of the comparator 64 is further applied to a comparator 65 in the succeeding stage, the output of which is again divided into two portions, one of them being directly applied to a succeeding comparator 67, while the other being applied to the comparator 67 through a similar delay circuit 66. The output of the delay circuit 66 is applied to the input of comparator 67 and at the same time fed back to comparators 62 and 65. At the output terminal 68, a signal which has been selected in response to the desired comb transmission characteristics is available.

It will be noted here that, with the construction of FIG. 5, an extremely unfavorable phenomenon is produced. Stated specifically, unless the delay time intervals of two delay lines 63 and 66 which are connected in cascade are exactly equal to one another, the overall transmission characteristics are extremely impaired (as is described on page 19 of the above-mentioned W. White article).

Figure 6:
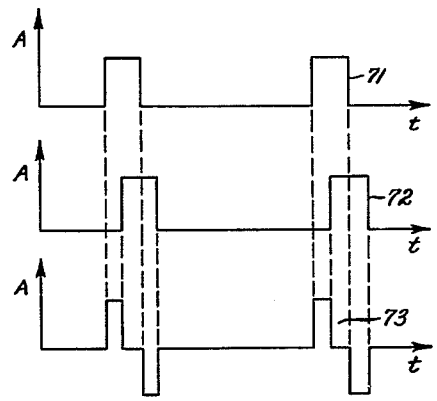
FIG. 6 illustrates the pulse wave forms encountered in the circuit of FIG. 5.

Now let us consider how the difference between the delay times of two delay lines in cascade impair the transmission characteristics of the delay line filter of FIG. 5. In FIG. 6, pulse waveforms 71, 72, and 73 denote, respectively, output pulse trains of the comparator 64, of delay circuit 66, and of comparator 67, each of which are produced by the reflected signals from targets entering into the attenuation band of FIG. 4. Although the pulse levels contained in these pulse trains are actually different from one another because the values of the characteristic curve in the attenuation band are not perfectly zero, these levels are illustrated as equal for simplicity. Where the delay time of the delay line 63 is exactly equal to that of the delay line 66, pulse waveform 71 will conform to the pulse waveform 72 in time with the result that no pulses appear at the output of the comparator 67. On the other hand, if the delay time of delay line 66 is a little longer than that of delay line 63 the pulses 71 are shifted in time from the pulses 72, with the result that a pulse train having the waveform shown by 73 appears at the output of comparator 67. That part of this waveform 73 which corresponds to the position where the pulses 71 and 72 coexist becomes zero, while those parts of the waveform 73 which correspond to non-coexistant portions of the pulses 71 and 72 become peaks. These latter parts impair the transmission characteristics of the delay line filter to a considerable extent. Thus, since it is extremely difficult to make the delay times and the amplitude characteristics of the two delay lines exactly equal, the possibility of designing the overall characteristics to a favorable degree becomes small. As has been previously mentioned the problem of a delay line filter's transmission characteristics also arises in an integrator which superimposes pulses arriving at regular intervals. In the foregoing description, the transmission characteristics of the delay line filter shown in FIGS. 3 and 4 have been described in terms of the pass characteristic with respect to frequency. If, however, the characteristic curve of FIG. 5 on page 193 in the above-mentioned W. White article is considered as the attenuation characteristic curve, it represents, as it is, the transmission characteristic curve of a delay line filter in an integrator. Therefore it may be understood that the same problem as that in an MTI radar arises.

Figure 7:
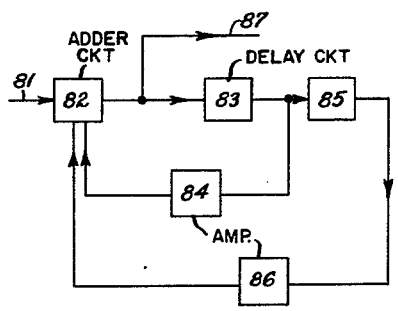
FIG. 7 shows a block diagram of a conventional signal integrator.

FIG. 7 shows a signal integrator, which similarly to FIG. 5 comprises two delay lines in cascade. The input pulses applied from an input terminal 81 are applied to an adder 82 together with the output pulses from two amplifiers 84 and 86. The output of the adder is then applied to a delay line 83. The output from the delay line 83 is fed back to adder 82 via amplifier 84 (which compensates for the lowering in signal level caused by the delay line 83) and is further fed back to adder 82 via another delay line 85 and amplifier 86. By adding the input from the input terminal 81 and the outputs of the amplifiers 84 and 86 an integrated pulse output is available at output terminal 87. The same problem as was involved in the circuit of FIG. 5 arises, however, from this circuit.

It is intended by the present invention to avoid deterioration in the overall characteristics of a delay line filter, including a plurality of delay lines, which occurs from the difference in delay times between the delay lines; by performing two different modulations on the signal passing through the delay line filter. This is equivalent to saying that one delay line is used twice.

Figure 8:
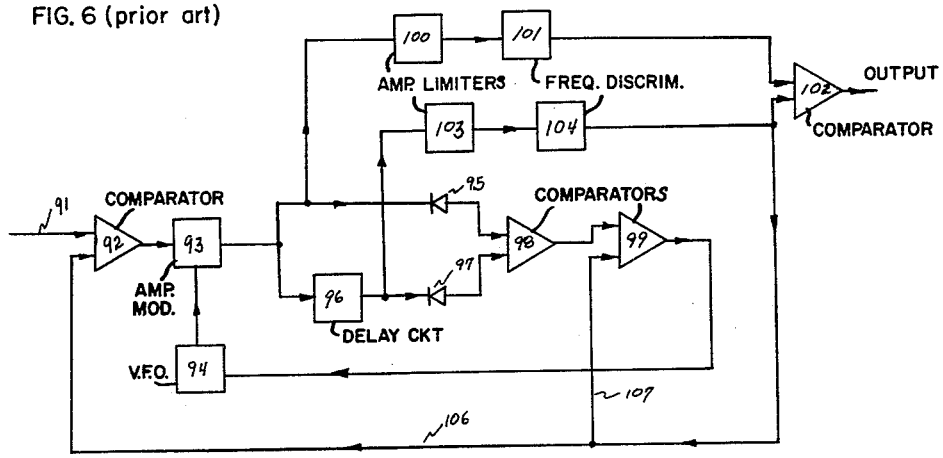
FIG. 8 illustrates a delay line filter according to the invention, for use in MTI radar.

Referring to FIG. 8, which shows a block diagram of an embodiment of this invention the input signal is applied to one terminal of a comparator 92 via an input terminal 91 (which corresponds to the input terminal 61 of FIG. 5) while the output of a frequency discriminator 104, as will be mentioned later, is applied to the other input terminal of this comparator. The output of the comparator 92, applied to an amplitude modulator 93, amplitude-modulates the output of the variable-frequency oscillator 94. The output of the amplitude modulator is divided into two parts; one part is detected by diode 95 and applied to one input terminal of comparator 98, while the other part is applied to the other terminal of the comparator 98 via delay line 96 and diode 97. The output of the comparator 98 is further applied to a comparator 99 to which the output of the above-mentioned frequency discriminator 104 is applied. The oscillation frequency of 94 is varied in response to the output of comparator 99 to which it is connected. Hence, the output of oscillator 94 is frequency-modulated by the ouput of comparator 99, with the result that the output of the amplitude modulator 93 contains not only a frequency modulated component, but also an amplitude modulated component which is caused by the input from comparator 92. Of these components, the amplitude modulation component is fed back through the aforementioned path while the frequency modulation component is applied to one input terminal of the comparator 102 through amplitude limiter 100 and frequency discriminator 101. Meanwhile the output of the delay line 96 is also applied to the comparator 102 through an amplitude limiter 103 and a frequency discriminator 104, whereby the delay line filter output is obtained at the output terminal 105 of the comparator 102. The output signal of the frequency discriminator 104, which receives the output of the delay line 96, is fed back to the inputs of comparators 92 and 99 by means of feedback circuits 106 and 107, respectively. The circuits 106 and 107, which are employed for the purpose of flattening the pass-band characteristics of the delay line filter as is the case with the connection from the output of delay line 66 to the inputs of the comparators 62 and 65, shown in FIG. 5, may be omitted together with the comparators 92 and 99. In such a case, the input signal may directly be applied to the amplitude modulator 93, while the output of the comparator 98 may be connected to the oscillator 94. Thus with a delay line filter according to this invention, an AM wave is passed at first through the delay line and then a frequency-modulated wave, whose carrier frequency used for amplitude modulation is changed by the detected output of the AM wave, is again passed through the delay line. After separating the amplitude modulation from the frequency modulation, by means of an amplitude limiter, frequency demodulation is performed. That is, the same delay line is used twice by the compound modulation of the frequency modulation and the amplitude modulation; whereby the aforementioned defect which may otherwise be caused by the difference of delay time between delay lines is completely obviated.

Figure 9:
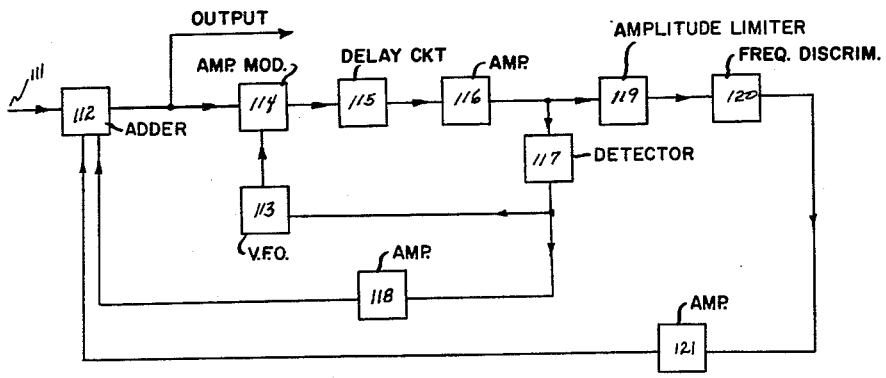
FIG. 9 illustrates a delay line filter, according to the invention, for use in a radar signal integrator.

Another embodiment of this invention for application to a signal integrator is shown in FIG. 9 in block form. The input pulses applied to an input terminal 111 (which corresponds to the input terminal 81 of the circuit of FIG. 7) are applied to an adder 112 together with the outputs of amplifiers 118 and 121 as will later be mentioned. The output of the adder 112 is applied to an amplitude modulator 114 together with the output of the oscillator 113. This amplitude modulator 114 functions in a similar manner to the amplitude modulator 93 of FIG. 8. That is, the output of the modulator 114 is applied to the AM wave detector 117 via delay line 115 and amplifier 116. The pulse train passing through the amplifier is applied to the oscillator 113, via detector 117, so as to control the oscillation frequency thereof and at the same time is fed back to the adder 112 via the amplifier 118. Amplifiers 116 and 118 compensate for the lowering in signal level at delay line 115 and detector 117, respectively. The output of the amplifier 116 is also applied to amplitude limiter 119, and via a frequency discriminator 120 and an amplifier 121 to adder 112. In the above manner the same effect as that obtained with the circuit of FIG. 8 is obtained by using one delay line twice for two modulations; one the amplitude modulation for the amplitude modulator 114 and the other the frequency modulation for the variable-frequency oscillator 113.

Although the above description has been based on the assumption that the amplitude modulation and the frequency modulation are effected in this order, there is no objection to reversing the order or using amplitude modulation and phase modulation.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. A delay line filter having comb filter characteristics comprising in combination a delay line, an amplitude modulator connected to said delay line, means coupled to said delay line for detecting the output thereof, a variable frequency oscillator coupled to the said amplitude modulator for supplying said amplitude modulator with frequency modulated oscillation and means for frequency demodulating the delay line output.

2. A delay line filter for use in Moving Target Indication radar comprising an input, an amplitude modulator coupled to said input, a delay line coupled to said modulator, means for detecting and comparing the amplitude modulator output with the output of said delay line, means for frequency demodulating and comparing the amplitude modulator output with the output of said delay line, and means for frequency modulating said amplitude modulator with the result of said first mentioned comparison.

3. A delay line filter for use in Moving Target Indication radar as claimed in claim 2 in which the last of said means comprises a variable frequency oscillator connected to said amplitude modulator.

4. A delay line filter for use in Moving Target Indication radar as claimed in claim 2 further comprising means connected between the said amplitude modulator and the said input for comparing the input with the frequency demodulated output of the delay line.

5. A delay line filter for use in Moving Target Indication radar as claimed in claim 2 further comprising means connected to said frequency modulating means for comparing the result of said detected and compared outputs with the frequency demodulated output of said delay line.

6. A delay line filter for use as a signal integrator comprising an input adder circuit having a plurality of inputs, an amplitude modulator coupled to the output of said adder circuit, a detector, a delay line coupled between said detector and said amplitude modulator, means for frequency modulating the output of said amplitude modulator with the output of said detector, means for coupling the output of said delay line to one input of said input adder circuit, and frequency demodulating means coupling the output of said delay line to another input of said adder circuit.

7. A delay line filter for use as a signal integrator as claimed in claim 6 in which the first mentioned of said means consists of a variable frequency oscillator connected between the detector and amplitude modulator.

8. A delay line filter for use in Moving Target Indication radar as claimed in claim 4 further comprising means connected to said frequency modulating means for comparing the result of said detected and compared outputs with the frequency demodulated output of said delay line.

References Cited in the file of this patent

UNITED STATES PATENTS 2,487,995     Tucker _____ Nov. 15, 1949